(12) United States Patent
Kim et al.

(10) Patent No.: US 9,301,000 B2
(45) Date of Patent: *Mar. 29, 2016

(54) METHOD FOR PROVIDING A CONTENT-SHARING SERVICE, AND A DEVICE THEREFOR

(71) Applicant: SAMSUNG ELECTRONICS CO., LTD., Suwon-si (KR)

(72) Inventors: Mun-Jo Kim, Suwon-si (KR); Eun-Hee Rhim, Yongin-si (KR); Kwang-kee Lee, Seoul (KR); In-chul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

This patent is subject to a terminal disclaimer.

(21) Appl. No.: 14/269,939

(22) Filed: May 5, 2014

(65) Prior Publication Data

US 2014/0245349 A1 Aug. 28, 2014

Related U.S. Application Data

(63) Continuation of application No. 12/865,252, filed as application No. PCT/KR2009/000372 on Jan. 23, 2009, now Pat. No. 8,762,465.

(60) Provisional application No. 61/026,292, filed on Feb. 5, 2008, provisional application No. 61/024,314, filed on Jan. 29, 2008.

(51) Int. Cl.
*G06F 15/16* (2006.01)
*H04N 21/266* (2011.01)
(Continued)

(52) U.S. Cl.
CPC .......... *H04N 21/266* (2013.01); *H04L 65/1066* (2013.01); *H04L 65/1069* (2013.01);
(Continued)

(58) Field of Classification Search
CPC ...................... H04L 65/1066; H04L 65/1069
USPC ................................ 709/204, 206; 725/232
See application file for complete search history.

(56) References Cited

U.S. PATENT DOCUMENTS 5,959,623 A 9/1999 van Hoff et al.
6,002,393 A 12/1999 Hite et al.
(Continued)

FOREIGN PATENT DOCUMENTS

CN 1744691 A 3/2006
CN 1781085 A 5/2006
(Continued)

OTHER PUBLICATIONS

International Search Report for PCT/KR2009/000372 issued Aug. 27, 2009 [PCT/ISA/210].
(Continued)

*Primary Examiner* — Adnan Mirza
(74) *Attorney, Agent, or Firm* — Sughrue Mion, PLLC

(57) ABSTRACT

A method and apparatus for providing contents-sharing services are provided. The method for providing contents-sharing services includes: receiving a contents-sharing request message for a contents sharer from a first contents reproducing apparatus of a contents sharing requester; transmitting a contents-sharing notify message generated using the received contents-sharing request message to a second contents reproducing apparatus of the contents sharer; and transmitting the received contents-sharing request message to a streaming server, wherein the transmitted contents-sharing request message requests the streaming server to transmit contents to the second contents reproducing apparatus of the contents sharer.

36 Claims, 7 Drawing Sheets

(51) Int. Cl.
*H04L 29/06* (2006.01)
*H04N 5/76* (2006.01)
*H04N 21/472* (2011.01)
*H04N 21/4788* (2011.01)
*H04N 21/488* (2011.01)
*H04N 21/81* (2011.01)

(52) U.S. Cl.
CPC ............ *H04N 5/76* (2013.01); *H04N 21/4788* (2013.01); *H04N 21/47202* (2013.01); *H04N 21/4882* (2013.01); *H04N 21/812* (2013.01)

(56) References Cited

U.S. PATENT DOCUMENTS

| | | |
|---|---|---|
| 6,029,045 A | 2/2000 | Picco et al. |
| 6,141,010 A | 10/2000 | Hoyle |
| 6,169,542 B1 | 1/2001 | Hooks et al. |
| 6,177,931 B1 | 1/2001 | Alexander et al. |
| 6,219,694 B1 | 4/2001 | Lazaridis et al. |
| 6,240,555 B1 | 5/2001 | Shoff et al. |
| 6,282,713 B1 | 8/2001 | Kitsukawa et al. |
| 6,415,438 B1 | 7/2002 | Blackketter et al. |
| 6,425,127 B1 | 7/2002 | Bates et al. |
| 6,513,069 B1 | 1/2003 | Abato et al. |
| 6,530,082 B1 | 3/2003 | Del Sesto et al. |
| 6,668,378 B2 | 12/2003 | Leak et al. |
| 6,698,020 B1 | 2/2004 | Zigmond et al. |
| 6,738,978 B1 | 5/2004 | Hendricks et al. |
| 6,766,426 B1 | 7/2004 | Sugiyama |
| 7,079,176 B1 | 7/2006 | Freeman et al. |
| 7,134,132 B1 | 11/2006 | Ngo et al. |
| 7,150,030 B1 | 12/2006 | Eldering et al. |
| 7,222,155 B1 | 5/2007 | Gebhardt et al. |
| 7,263,711 B1 | 8/2007 | Estipona |
| 7,444,659 B2 | 10/2008 | Lemmons |
| 7,694,318 B2 | 4/2010 | Konig et al. |
| 7,802,276 B2 | 9/2010 | Swix et al. |
| 7,849,135 B2 | 12/2010 | Agrawal et al. |
| 2002/0038383 A1 | 3/2002 | Ullman et al. |
| 2002/0083441 A1 | 6/2002 | Flickinger et al. |
| 2002/0083445 A1 | 6/2002 | Flickinger et al. |
| 2002/0144262 A1 | 10/2002 | Plotnick et al. |
| 2002/0156909 A1 | 10/2002 | Harrington |
| 2002/0162115 A1 | 10/2002 | Bruckner et al. |
| 2002/0184091 A1 | 12/2002 | Pudar |
| 2002/0194595 A1 | 12/2002 | Miller et al. |
| 2003/0056219 A1 | 3/2003 | Reichardt et al. |
| 2003/0101454 A1 | 5/2003 | Ozer et al. |
| 2003/0145338 A1 | 7/2003 | Harrington |
| 2003/0149975 A1 | 8/2003 | Eldering et al. |
| 2003/0177490 A1 | 9/2003 | Hoshino et al. |
| 2003/0219041 A1 | 11/2003 | Oh |
| 2003/0231854 A1 | 12/2003 | Derrenberger |
| 2004/0194130 A1 | 9/2004 | Konig et al. |
| 2004/0194131 A1 | 9/2004 | Ellis et al. |
| 2004/0236844 A1 | 11/2004 | Kocherlakota |
| 2005/0028195 A1 | 2/2005 | Feinleib et al. |
| 2005/0039205 A1 | 2/2005 | Riedl |
| 2005/0044361 A1 | 2/2005 | Chang et al. |
| 2005/0120386 A1 | 6/2005 | Stone |
| 2005/0177421 A1 | 8/2005 | Fijimoto |
| 2005/0227678 A1 | 10/2005 | Agrawal et al. |
| 2005/0235318 A1 | 10/2005 | Grauch et al. |
| 2005/0251690 A1 | 11/2005 | Kuno et al. |
| 2005/0254524 A1 | 11/2005 | An |
| 2005/0266835 A1 | 12/2005 | Agrawal et al. |
| 2006/0041596 A1 | 2/2006 | Stirbu et al. |
| 2006/0093325 A1 | 5/2006 | Imai et al. |
| 2006/0126551 A1 | 6/2006 | Delaunay et al. |
| 2006/0200534 A1 | 9/2006 | Nagai et al. |
| 2006/0217072 A1 | 9/2006 | Poyhonen et al. |
| 2006/0236352 A1 | 10/2006 | Scott |
| 2007/0039033 A1 | 2/2007 | Ota |
| 2007/0042737 A1 | 2/2007 | Peusens |
| 2007/0064637 A1 | 3/2007 | Lee et al. |
| 2007/0064712 A1 | 3/2007 | Lee et al. |
| 2007/0124359 A1 | 5/2007 | Hwang et al. |
| 2007/0127377 A1 | 6/2007 | Brocke et al. |
| 2007/0157281 A1 | 7/2007 | Ellis et al. |
| 2007/0226761 A1 | 9/2007 | Zalewski et al. |
| 2007/0233879 A1 | 10/2007 | Woods et al. |
| 2007/0234207 A1 | 10/2007 | Turakhia |
| 2007/0249367 A1 | 10/2007 | Sato et al. |
| 2007/0265932 A1 | 11/2007 | Im et al. |
| 2008/0002690 A1 | 1/2008 | Ver Steeg et al. |
| 2008/0127259 A1 | 5/2008 | Hong et al. |
| 2008/0133650 A1 | 6/2008 | Saarimaki et al. |
| 2008/0134236 A1 | 6/2008 | Iijima et al. |
| 2008/0168496 A1 | 7/2008 | Lee et al. |
| 2008/0256232 A1 | 10/2008 | Fleury et al. |
| 2009/0138441 A1 | 5/2009 | Valentine et al. |

FOREIGN PATENT DOCUMENTS

| | | |
|---|---|---|
| JP | 2000349833 A | 12/2000 |
| JP | 2001211410 A | 8/2001 |
| JP | 200788896 A | 4/2007 |
| KR | 10-2001-0049666 A | 6/2001 |
| KR | 10-2003-0091396 A | 12/2003 |
| KR | 10-2005-0020165 A | 3/2005 |
| KR | 1020050022631 A | 3/2005 |
| KR | 20060048848 A | 5/2006 |
| KR | 1020060046678 A | 5/2006 |
| KR | 1020060059583 A | 6/2006 |
| KR | 1020060073071 A | 6/2006 |
| KR | 1020060135270 A | 12/2006 |
| KR | 10-2007-0011442 A | 1/2007 |
| KR | 1020070048922 A | 5/2007 |
| KR | 1020070049044 A | 5/2007 |
| KR | 10-2007-0065501 A | 6/2007 |
| KR | 10-2007-0066616 A | 6/2007 |
| KR | 10-2007-0094567 A | 9/2007 |
| KR | 1020070100966 A | 10/2007 |
| KR | 10-0940981 B1 | 2/2010 |
| WO | 9853611 | 11/1998 |
| WO | 2007/056077 A2 | 5/2007 |
| WO | 2007/096815 A1 | 8/2007 |

OTHER PUBLICATIONS

European Search Report issued Jul. 7, 2011 in counterpart European Patent Application No. 09705414.2.
European Search Report issued Jul. 25, 2011 in counterpart European Patent Application No. 09704986.0.
U.S Final Office Action issued on Aug. 15, 2011 in corresponding U.S. Appl. No. 12/361,137.
U.S. Non-Final Office Action issued Mar. 31, 2011 in corresponding U.S. Appl. No. 12/361,137.
U.S. Non Final Office Action issued on Mar. 28, 2011 in corresponding U.S. Appl. No. 12/360,287.
U.S. Non-Final Office Action issued on Nov. 8, 2011 in corresponding U.S. Appl. No. 12/360,287.
Office Action dated Mar. 26, 2012, issued by the U.S. Appl. No. 12/360,287.
Office Action dated Apr. 13, 2012, issued by the U.S. Appl. No. 12/361,137.
Communication dated Feb. 29, 2012, issued by the State Intellectual Property Office of P.R. China in counterpart Chinese Application No. 200980103346.1.
Office Action issued Jun. 6, 2012 by the State Intellectual Property Office of the People's Republic of China in counterpart Chinese Application No. 200980103346.1.
Communication from the Indonesian Intellectual Property Office dated Sep. 4, 2012, in a counterpart application No. W-00201002921.
Communication dated Sep. 6, 2012 from the State Intellectual Property Office of P.R. China in a counterpart application No. 200980103346.1.
Communication dated Mar. 11, 2013 issued by the State Intellectual Property Office of P.R. China in counterpart Chinese Patent Application No. 200980103346.1.

(56) References Cited

OTHER PUBLICATIONS

Office Action, dated May 27, 2013, issued by the Indonesian Patent Office in counterpart Indonesian Patent Application No. W-00201002922.
Communication dated Dec. 31, 2014, issued by the State Intellectual Property Office of P. R. China in counterpart Chinese Application No. 200980103346.1.
Communication dated Mar. 18, 2015, issued by the Korean Intellectual Property Office in counterpart Korean Application No. 10-2010-7014184.
Communication dated Sep. 22, 2014 issued by the Korean Intellectual Property Office in counterpart Korean Patent Application No. 10-2008-0130445.
Communication dated Oct. 22, 2014 issued by the State Intellectual Property Office of P.R. China in counterpart Chinese Patent Application No. 200980103449.8.
Communication from the European Patent Office issued Jul. 22, 2015 in a counterpart European Application No. 09705414.2.
Communication dated Apr. 14, 2015, issued by the Korean Intellectual Property Office in counterpart Korean Application No. 10-2009-7015541.
Communication dated Jun. 1, 2015, issued by the State Intellectual Property Office of P.R. China in counterpart Chinese Application No. 200980103346.1.
Communication from the State Intellectual Property Office of P.R. China dated Sep. 30, 2015 in a counterpart Chinese application no. 200980103346.1.

FIG. 2

```
<DigitalCouponDesciptor>
    <Content id="crid://samsung.com/content1">
        <Title> Matrix </Title>
        <Duration> PT01H00M00S </Duration>
        <StartPosition>PT00H01M30S</StartPosition>
    </Content>
    <Requester id="User A"/>
    <Receiver id="User B"/>
    <ForcedMediaControl>
        <Operator> User A </Operator>
        <Receiver> User B </Receiver>
        <Mode>ALL </Mode>
    <ForcedMediaControl>
<DigitalCouponDesciptor>
```

FIG. 3

```
<DigitalCouponAlarm>
    <Content id="crid://samsung.com/content1">
        <Title> Matrix </Title>
        <Duration> PT01H00M00S </Duration>
        <StartPosition>PT00H01M30S</StartPosition>
        <Requester id> User A </Requesterid>
    </Content>
    <License>http://drm.key.location.co.kr <License>
<DigitalCouponAlarm>
```

FIG. 4

| CONTENTS-SHARING TABLE | | | | | |
|---|---|---|---|---|---|
| IP OF SHARING REQUESTER | ID OF SHARING REQUESTER | IP OF SHARER | ID OF SHARER | CONTENTS-SHARING MODE INFORMATION | REPRODUCTION START TIME INFORMATION |
| 168.219.201.xxx | User A | 168.219.202.xxx | User B | ALL | 00H01M30S |
| 168.219.203.xxx | User C | 168.219.204.xxx | User D | PLAY PAUSE | 00H00M30S |

METHOD FOR PROVIDING A CONTENT-SHARING SERVICE, AND A DEVICE THEREFOR

CROSS REFERENCE TO RELATED APPLICATION

This application is a continuation of U.S. application Ser. No. 12/865,314, filed on Jul. 29, 2010, which is a National Stage application under 35 U.S.C. §371 of PCT/KR2009/000372 filed on Jan. 23, 2009, which claims the benefit of U.S. Provisional Patent Application No. 61/024,314, filed on Jan. 29, 2008, and U.S. Provisional Patent Application No. 61/026,292, filed on Feb. 5, 2008, all the disclosures of which are incorporated herein in their entireties by reference.

BACKGROUND

1. Field

Apparatuses and methods consistent with exemplary embodiments relate to a method of providing contents-sharing services, and more particularly, to a method and device for providing contents and contents-sharing services, in which a contents-sharing requester and a contents sharer synchronize and share control during contents reproduction.

2. Description of the Related Art

Video On Demand (VOD) services relate to a bi-directional system capable of providing one or more remotely-located users with contents associated with movies, education, games, shopping, and the like that are stored in the form of digital data via a communication network.

Recently, various demands of users to use VOD services have been increasing with the development of VOD services. For example, a user may want to select contents as a gift for another user while reviewing a list of contents reproducible through VOD services, and to share the contents with the other user.

Furthermore, a user may want to give contents as a gift to another user while watching the contents through VOD services, so as to share the contents with the other user. In this case, the user may desire to synchronize and share control associated with contents reproduction of the contents.

However, current VOD services are difficult to satisfy users' contents-sharing desires as described above.

SUMMARY

Aspects of one or more exemplary embodiments provide a contents sharing requester and a contents sharer which synchronize and share contents and control during contents reproduction, so that a contents-sharing demand of users who use Video On Demand (VOD) services can be satisfied and a users' convenience can be increased.

Aspects of one or more exemplary embodiments also provide contents-sharing services for a contents sharer at the same time personalized services for the contents sharer and advertisement services are provided, so that an increased users' convenience and an improved service quality can be obtained when the contents-sharing services are provided and used.

According to an aspect of an exemplary embodiment, there is provided a contents-sharing service providing method performed in a management server, the contents-sharing service providing method including: receiving a contents-sharing request message for a contents sharer from a contents reproducing apparatus of a contents sharing requester; transmitting a contents-sharing notify message generated using the received contents-sharing request message to a contents reproducing apparatus of the contents sharer; and transmitting the received contents-sharing request message to a streaming server, wherein the transmitted contents-sharing request message requests the streaming server to transmit contents to the second contents reproducing apparatus of the contents sharer.

The contents-sharing request message may include at least one of contents information, reproducing duration information, information about the contents-sharing requester, information about the contents sharer, and contents-sharing mode information.

The contents-sharing notify message may include at least one of contents information, reproducing duration information, information about the contents-sharing requester, and contents authority acquiring server Uniform Resource Locator (URL) information.

The contents-sharing notify message may further include at least one of information to provide personalized services for the contents sharer and information to provide advertisement services.

At least one of the contents-sharing request message and the contents-sharing notify message may be written in Extensible Markup Language (XML) format.

The contents-sharing service providing method may further include: transmitting contents authority information of the contents sharer to the contents reproducing apparatus of the contents sharer; and transmitting the contents authority information to the streaming server.

According to an aspect of another exemplary embodiment, there is provided a computer-readable recording medium having recorded thereon a program for executing the contents-sharing service providing method.

According to an aspect of another exemplary embodiment, there is provided a contents sharing method performed in a contents reproducing apparatus, the contents sharing method including: receiving a contents-sharing notify message from a management server; receiving contents authority information of a contents sharer from a contents authority acquiring server by using location information of the contents authority acquiring server, wherein the location information is included in the contents-sharing notify message; and transmitting a contents-sharing request message to a streaming server according to information included in the received contents-sharing notify message and the received contents authority information, wherein the contents-sharing request message requests the streaming server to transmit contents to the contents reproducing apparatus.

The contents-sharing notify message may include at least one of contents information, reproducing duration information, information about the contents-sharing requester, and contents authority acquiring server URL information.

The contents-sharing notify message may be written in XML format.

Contents may be received from the streaming server from a point in time when the contents-sharing requester performs reproduction, according to reproduction start time information included in the reproducing duration information.

The contents sharing method may further include: receiving a contents control command from the streaming server; and controlling contents reproduction by using the received contents control command.

According to an aspect of another exemplary embodiment, there is provided a computer-readable recording medium having recorded thereon a program for executing the contents sharing method.

According to an aspect of another exemplary embodiment, there is provided a contents-sharing control method performed in a streaming server, the contents-sharing control method including: receiving a contents-sharing request message from a management server; generating a contents-sharing table according to information included in the received contents-sharing request message; receiving a contents control command from a contents reproducing apparatus of a contents sharing requester; and selectively transmitting the contents control command to a contents reproducing apparatus of a contents sharer according to the generated contents-sharing table.

The contents-sharing request message and the contents-sharing table may include at least one of contents information, reproducing duration information, information about the contents-sharing requester, information about the contents sharer, and contents-sharing mode information.

The contents-sharing mode information may describe contents-control commands which are to be shared, in units of control commands or overall control commands.

The transmitting of the contents control command may be performed if the contents-sharing mode information allows transmission of the contents control command.

The contents-sharing control method may further include receiving contents authority information from a contents authority acquiring server.

According to an aspect of another exemplary embodiment, there is provided a computer-readable recording medium having recorded thereon a program for executing the contents-sharing control method.

According to an aspect of another exemplary embodiment, there is provided a management server including: a contents-sharing request message reception unit which receives a contents-sharing request message for a contents sharer from a contents reproducing apparatus of a contents sharing requester; a contents reproducing apparatus interface unit which transmits a contents-sharing notify message generated using the received contents-sharing request message to a contents reproducing apparatus of the contents sharer; and a streaming server interface unit which transmits the received contents-sharing request message to a streaming server, wherein the transmitted contents-sharing request message requests the streaming server to transmit contents to the second contents reproducing apparatus of the contents sharer.

According to an aspect of another exemplary embodiment, there is provided a contents reproducing apparatus including a management server interface unit which receives a contents-sharing notify message from a management server; a contents authority acquiring server interface unit which receives contents authority information of a contents sharer from a contents authority acquiring server according to location information of the contents authority acquiring server included in the received contents-sharing notify message; and a contents reception unit which transmits a contents-sharing request message to a streaming server according to information included in the received contents-sharing notify message and the received contents authority information, wherein the contents-sharing request message requests the streaming server to transmit contents to the contents reproducing apparatus.

According to an aspect of another exemplary embodiment, there is provided a streaming server including: a management server interface unit which receives a contents-sharing request message from a management server; a table generation unit which generates a contents-sharing table according to information included in the received contents-sharing request message; a control command reception unit which receives a contents control command from a contents reproducing apparatus of a contents sharing requester; and a control command transmission unit which selectively transmits the received contents control command to a contents reproducing apparatus of a contents sharer according to the generated contents-sharing table.

According to an aspect of another exemplary embodiment, there is provided a contents sharing method performed in a contents reproducing apparatus, the contents sharing method including: receiving a contents-sharing notify message from a management server; transmitting a contents-sharing request message to a streaming server according to information included in the received contents-sharing notify message, wherein the contents-sharing request message requests the streaming server to transmit contents to the contents reproducing apparatus, and wherein a contents reproducing requesting apparatus, distinct from the contents reproducing apparatus, requests the transmitting of the contents to the contents reproducing apparatus.

According to an aspect of another exemplary embodiment, there is provided a contents sharing service method including: transmitting, from a first contents reproducing apparatus to a management server, a contents-sharing request message requesting transmission of contents to a second contents reproducing apparatus, different from the first contents reproducing apparatus; generating, by the management server, a contents-sharing notify message according to the contents-sharing request message; transmitting, from the management server to the second contents reproducing apparatus, the generated contents-sharing notify message; transmitting, from the second contents reproducing apparatus to a streaming server, a request for the contents according to the contents-sharing notify message; transmitting, from the streaming server to the first contents reproducing apparatus and the second contents reproducing apparatus, the contents according to the request, wherein the streaming server controls a synchronizing and control sharing of a reproduction of the contents between the first contents reproducing apparatus and the second contents reproducing apparatus.

BRIEF DESCRIPTION OF THE DRAWINGS

The above and/or other aspects will become more apparent from the following description of exemplary embodiments with reference to the attached drawings in which:

FIG. 2 illustrates a contents-sharing request message format according to an exemplary embodiment;

FIG. 3 illustrates a contents-sharing notify message format according to an exemplary embodiment;

FIG. 4 illustrates a contents-sharing table according to an exemplary embodiment;

DETAILED DESCRIPTION OF EXEMPLARY EMBODIMENTS

Figure 1:
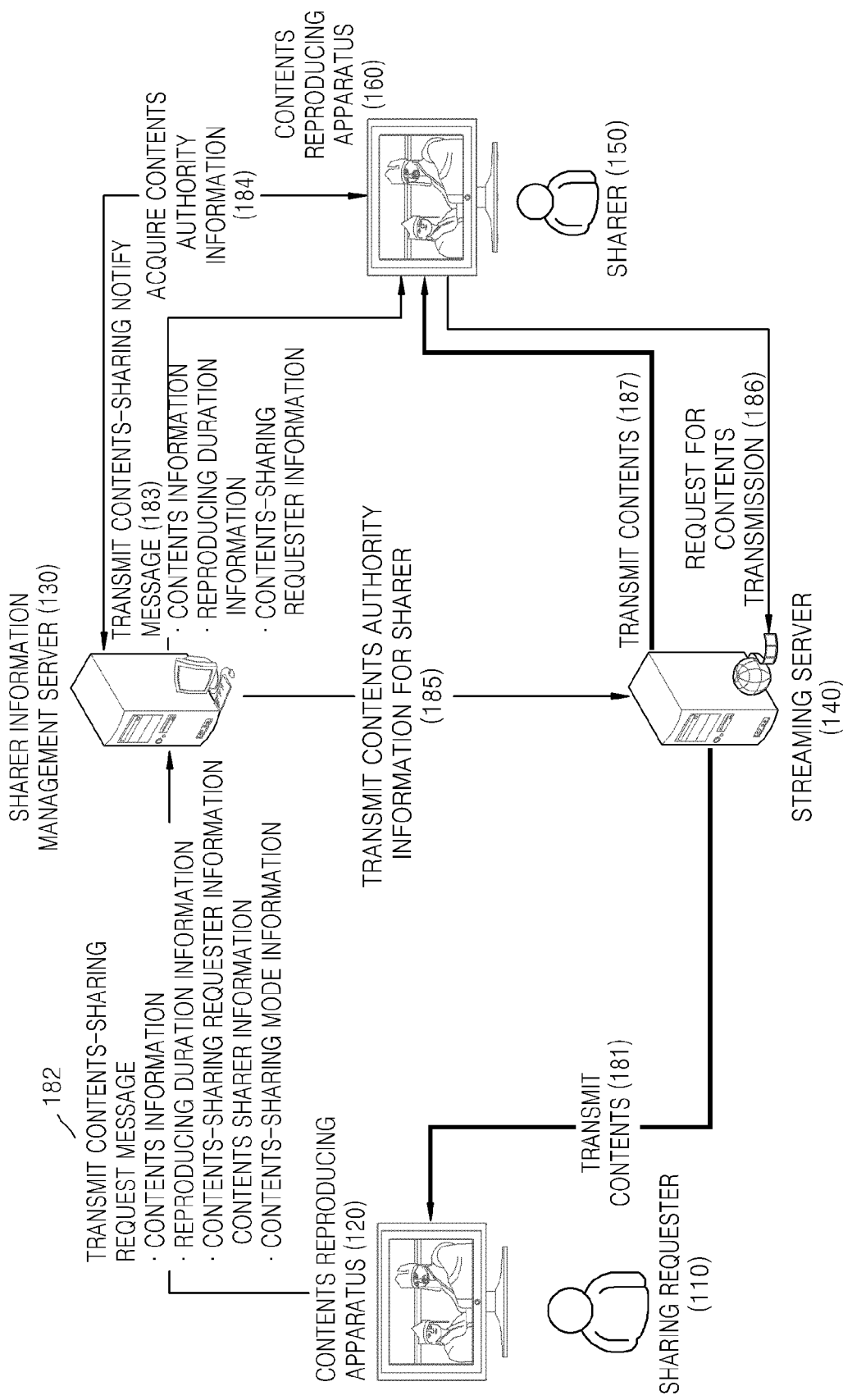
FIG. 1 is a schematic view of a contents-sharing service according to an exemplary embodiment.

Hereinafter, exemplary embodiments will be described in detail with reference to the attached drawings. Like reference numerals in the drawings denote like elements. In the drawings, the sizes of components are exaggerated for clarity. Expressions such as "at least one of," when preceding a list of elements, modify the entire list of elements and do not modify the individual elements of the list.

FIG. 1 is a schematic view of a contents-sharing service according to an exemplary embodiment. Referring to FIG. 1, the contents-sharing service includes a management server 130, a streaming server 140, a contents reproducing apparatus 120 of a sharing requester 110, and a contents reproducing apparatus 160 of a sharer 150, which exist on a network.

The management server 130 controls the streaming server 140 and the contents reproducing apparatus 160 of the sharer 150 to provide the contents-sharing service. The streaming server 140 is a server that provides contents (e.g., a digital broadcasting program) in real time. An operation of the contents-sharing service will now be described.

While reproducing the contents provided by the streaming server 140 in operation 181, the sharing requester 110 desires to share the reproduced contents with the sharer 150. The contents reproducing apparatus 120 of the sharing requester 110 transmits a contents-sharing request message to the management server 130, in operation 182. The contents-sharing request message includes at least one of contents information, reproducing duration information, contents-sharing requester information, contents sharer information, contents-sharing mode information, etc.

The management server 130 generates a contents-sharing notify message including at least one of the pieces of information included in the contents-sharing request message received from the contents reproducing apparatus 120 of the sharing requester 110, and transmits the contents-sharing notify message to the contents reproducing apparatus 160 of the sharer 150 in operation 183. The contents reproducing apparatus 160 of the sharer 150 may be notified that contents (for example, as a gift) have arrived from the management server 130, by receiving the contents-sharing notify message. The contents-sharing notify message includes at least one of the contents information, the reproducing duration information, the contents-sharing requester information, authority acquiring server location information (such as Uniform Resource Locator (URL) information), etc.

The contents reproducing apparatus 160 of the sharer 150 requests a contents authority acquiring server for information about authority to receive or reproduce the contents (hereinafter, referred to as contents authority information) by using the contents authority acquiring server location information included in the contents-sharing notify message. Accordingly, the contents reproducing apparatus 160 of the sharer 150 acquires the contents authority information from the contents authority acquiring server, in operation 184. The contents authority acquiring server transmits the contents authority information to the streaming server 140, in operation 185. The management server 130 transmits the contents-sharing request message for the sharer 150 to the streaming server 140. It is understood that the contents authority acquiring server may be the same as or different from the management server 130 according to various exemplary embodiments.

The contents reproducing apparatus 160 of the sharer 150 requests the streaming server 140 to transmit contents from a point in time when the sharing requester 110 performs reproduction, by using the information included in the contents-sharing notify message and the contents authority information, in operation 186. The streaming server 140 checks the authority of the sharer 150 to receive or reproduce the contents and the contents reproduction point in time, and transmits the contents to the contents reproducing apparatus 160 of the sharer 150 from the point in time when the sharing requester 110 performs reproduction, in operation 187.

Thereafter, when the sharing requester 110 transmits a control command, such as reproduction stoppage or the like, to the streaming server 140 during contents reproduction, the streaming server 140 determines whether the received control command is allowed by referring to the contents-sharing mode information included in the contents-sharing request message. For example, the streaming server 140 may generate a contents-sharing table including the contents-sharing mode information and may refer to the contents-sharing table when determining whether the received control command is to be transmitted. Generation and management of the contents-sharing table according to an exemplary embodiment will be described in detail later with reference to FIG. 4.

When it is determined from the contents-sharing mode information that the control command from the sharing requester 110 is allowed, the streaming server 140 synchronizes and shares control during contents reproduction by transmitting the control command to the contents reproducing apparatus 160 of the sharer 150.

According to an exemplary embodiment, a contents sharing requester 110 and a contents sharer 150 may synchronize and share contents control during contents reproduction, so that a contents-sharing demand of users who use Video On Demand (VOD) services can be satisfied and the users' convenience can be increased.

Furthermore, according to an exemplary embodiment, the management server 130 updates the contents-sharing notify message by using information used to provide personalized services for a contents sharer and advertisement services, and transmits the updated contents-sharing notify message to the contents reproducing apparatus 160 of the sharer 150. In response to the updated contents-sharing notify message, the contents reproducing apparatus 160 of the sharer 150 may receive personalized services and advertisement services by using the above-described information used to provide personalized services and advertisement services, before reproducing contents.

Moreover, according to an exemplary embodiment, the contents-sharing service for the contents sharer 150 may be provided together with personalized services for the contents sharer 150 and advertisement services, so that increased users' convenience and an improved service quality can be obtained when the contents-sharing services are provided and used.

FIG. 2 illustrates a format of a contents-sharing request message, according to an exemplary embodiment. In the present exemplary embodiment, the contents-sharing request message is transmitted from a contents reproducing apparatus 120 of a sharing requester 110 to a management server 130 in order to request contents sharing with the contents sharer 150. The contents-sharing request message is also transmitted from the management server 130 to a streaming server 140 so that the streaming server 140 may generate and manage the contents-sharing table.

Referring to FIG. 2, the contents-sharing request message includes contents information, reproducing duration information, contents-sharing requester information, contents sharer information, and contents-sharing mode information. Although the contents-sharing request message is written in the eXtensible MarkupLanguage (XML) format in the present exemplary embodiment, it is understood that the contents-sharing request message may be written in another format according to another exemplary embodiment. In the present exemplary embodiment, a protocol such as real time streaming protocol (RTSP), hyper text transfer protocol (HTTP), etc., may be used to transmit the contents-sharing request message.

As shown in FIG. 2, the contents information includes a contents title. The reproducing duration information includes information about an overall contents reproduction duration and information about a point in time when the contents-sharing requester 110 performs reproduction. The contents-sharing requester information and the contents sharer information include an identifier (ID) of the contents-sharing requester 110 and an ID of the sharer 150, respectively. The contents-sharing mode information includes an ID of a person who transmits a control command during contents reproduction, an ID of a person who receives the control command, and control mode information.

FIG. 3 illustrates a format of a contents-sharing notify message, according to an exemplary embodiment. In the present exemplary embodiment, the contents-sharing notify message is transmitted from a management server 130 to a contents reproducing apparatus 160 of a sharer 150 in order to notify that contents (for example, as a gift) have arrived from a sharing requester 110.

Referring to FIG. 3, the contents-sharing notify message includes contents information, reproducing duration information, contents-sharing requester information, and contents authority acquiring server URL information. Although the contents-sharing notify message is written in the XML format in the present exemplary embodiment, it is understood that the contents-sharing notify message may be written in another format according to another exemplary embodiment. In the present exemplary embodiment, a protocol such as RTSP, HTTP, etc., may be used to transmit the contents-sharing notify message.

As shown in FIG. 3, the contents information includes a contents title. The reproducing duration information includes information about an overall contents reproduction duration and information about a point in time when the contents-sharing requester 110 performs reproduction. The contents-sharing requester information includes an ID of the contents-sharing requester 110.

The contents authority acquiring server URL information provides URL information of a contents authority acquiring server that can be requested by the contents reproducing apparatus 160 of the sharer 150 for authority to reproduce or receive the contents that may be protected, for example, by Digital Rights Management (DRM). The contents reproducing apparatus 160 of the sharer 150 requests the contents authority acquiring server for information about the authority to receive or reproduce the contents and acquires the contents authority information from the contents authority acquiring server. The contents authority information generated by the contents authority acquiring server is also transmitted to the streaming server 140. It is understood that the contents authority acquiring server may be the same as or different from the management server 130 in various exemplary embodiments.

According to an exemplary embodiment, the management server 130 may update the contents-sharing notify message by using information used to provide personalized services for the contents sharer and advertisement services, and may transmit the updated contents-sharing notify message to the contents reproducing apparatus 160 of the sharer 150. The information used to provide personalized services for the contents sharer and advertisement services may be URL information of a server that provides services. In response to the updated contents-sharing notify message, the contents reproducing apparatus 160 of the sharer 150 may receive advertisement services from advertisement sites specified as a URL, before or during the reproducing of the contents.

FIG. 4 illustrates a contents-sharing table according to an exemplary embodiment. In the present exemplary embodiment, the contents-sharing table is generated and operated by a streaming server 140. The streaming server 140 receives a contents-sharing request message from a management server 130 and generates the contents-sharing table by referring to information included in the contents-sharing request message.

Referring to FIG. 4, the contents-sharing table includes information about an Internet protocol (IP) and an ID of a sharing requester 110, information about an IP and an ID of a sharer 150, contents-sharing mode information, and reproduction start time information. The contents-sharing mode information describes contents-control commands which are to be shared, in units of control commands or overall control commands.

When a contents reproducing apparatus 120 of the sharing requester 110 transmits a control command, such as a reproduction stoppage or the like, to the streaming server 140 during contents reproduction, the streaming server 140 determines whether the control command is allowed by referring to the contents-sharing table. When it is determined from the contents-sharing mode information included in the contents-sharing table that the control command from the contents reproducing apparatus 120 of the sharing requester 110 is allowed, the streaming server 140 transmits the control command to a contents reproducing apparatus 160 of the sharer 150 to synchronize and share the control during contents reproduction.

Figure 5:
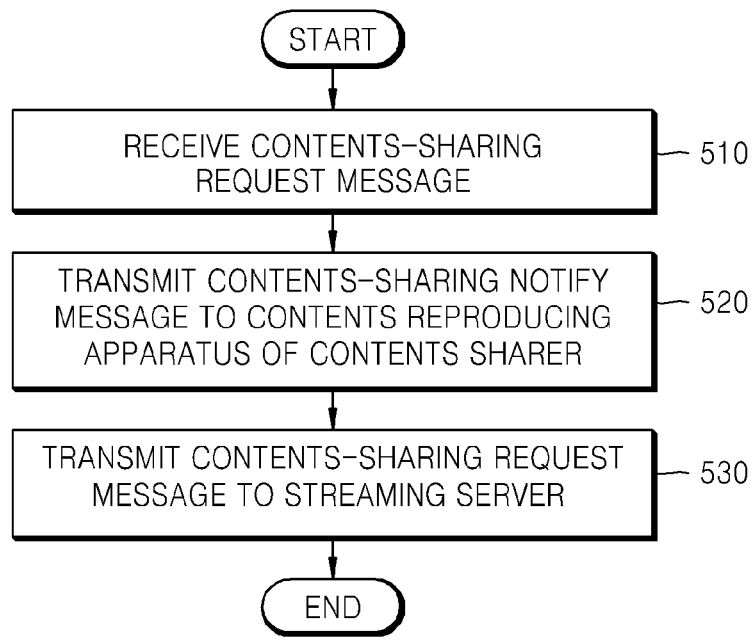
FIG. 5 is a flowchart of a contents-sharing service providing method performed by a management server, according to an exemplary embodiment.

FIG. 5 is a flowchart of a contents-sharing service providing method performed by a management server 130, according to an exemplary embodiment. Referring to FIG. 5, in operation 510, the management server 130 receives a contents-sharing request message for a contents sharer 150 from a contents reproducing apparatus 120 of a sharing requester 110. The contents-sharing request message includes at least one of contents information, reproducing duration information, contents-sharing requester information, contents sharer information, contents-sharing mode information, etc.

In operation 520, the management server 130 transmits a contents-sharing notify message to a contents reproducing apparatus 160 of the contents sharer 150. The contents-sharing notify message includes at least one of contents information, reproducing duration information, contents-sharing requester information, contents authority acquiring server URL information, etc. Thereafter, the contents reproducing apparatus 160 of the contents sharer 150 may request a contents authority acquiring server for contents authority information by using the contents authority acquiring server URL information included in the contents-sharing notify message.

In operation 530, the management server 130 transmits the contents-sharing request message to a streaming server 140 so that the streaming server 140 may generate a contents-sharing table. The contents authority acquiring server may also transmit the contents authority information transmitted to the contents reproducing apparatus 160 of the contents sharer 150 to the streaming server 140.

It is understood that the contents authority acquiring server may be the same as or different from the management server 130 in various exemplary embodiments.

According to another exemplary embodiment, the management server 130 may update the contents-sharing notify message by using information used to provide personalized services for the contents sharer and advertisement services, and may transmit the updated contents-sharing notify message to the contents reproducing apparatus 160 of the sharer 150. The information used to provide personalized services for the contents sharer and advertisement services may be URL information of a server that provides services.

While the contents-sharing request message and the contents-sharing notify message are written in XML format in the present exemplary embodiment and are transmitted using a protocol such as RTSP, HTTP, etc., it is understood that the messages may be written in any other format and transmitted using any other protocol according to various exemplary embodiments.

Figure 6:
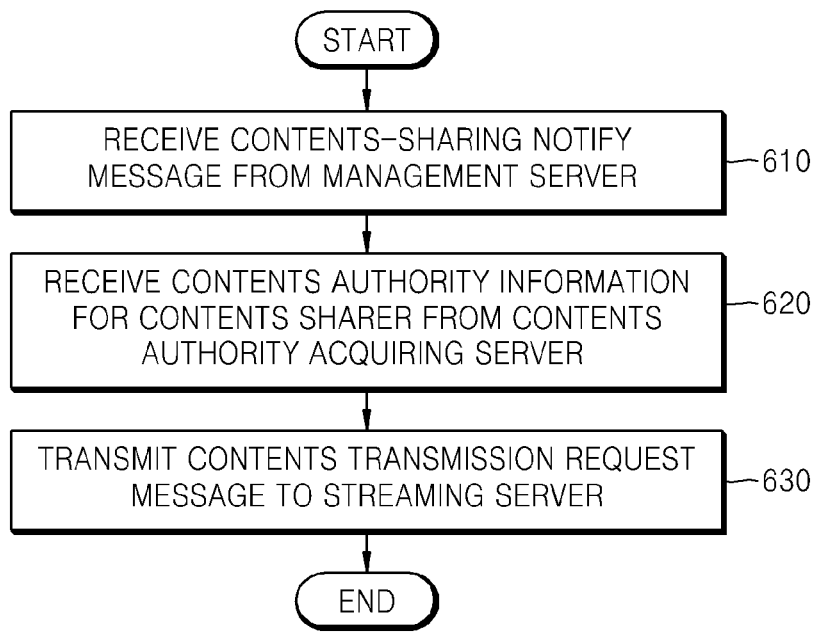
FIG. 6 is a flowchart of a contents sharing method performed by a contents reproducing apparatus of a contents sharer, according to an exemplary embodiment.

FIG. 6 is a flowchart of a contents sharing method performed by a contents reproducing apparatus 160 of a contents sharer 150, according to an exemplary embodiment. Referring to FIG. 6, in operation 610, the contents reproducing apparatus 160 of the sharer 150 receives the contents-sharing notify message from a management server 130. The contents-sharing notify message includes at least one of contents information, reproducing duration information, contents-sharing requester information, contents authority acquiring server URL information, etc.

In operation 620, the contents reproducing apparatus 160 of the sharer 150 receives contents authority information for the sharer 150 from a contents authority acquiring server by using the contents authority acquiring server URL information included in the contents-sharing notify message.

In operation 630, the contents reproducing apparatus 160 of the sharer 150 transmits a contents-sharing request message to a streaming server 140 by using information included in the contents-sharing notify message and the contents authority information. The contents reproducing apparatus 160 of the sharer 150 may receive contents from the streaming server 140 from the point in time when a contents-sharing requester 110 performs reproduction, by using the reproduction start time information included in the contents-sharing notify message.

Thereafter, when the sharing requester 110 transmits a control command, such as reproduction stoppage or the like, to the streaming server 140 during contents reproduction, the streaming server 140 determines whether the received control command is allowed, by referring to a contents-sharing table. The streaming server 140 generates the contents-sharing table including contents-sharing mode information and refers to the contents-sharing table when determining whether the received control command is to be transmitted.

When it is determined from the contents-sharing mode information that the control command from the sharing requester 110 is allowed, the streaming server 140 transmits the control command to the contents reproducing apparatus 160 of the sharer 150.

The contents reproducing apparatus 160 of the sharer 150 receives the contents control command from the streaming server 140 and controls contents reproduction by using the contents control command.

Figure 7:
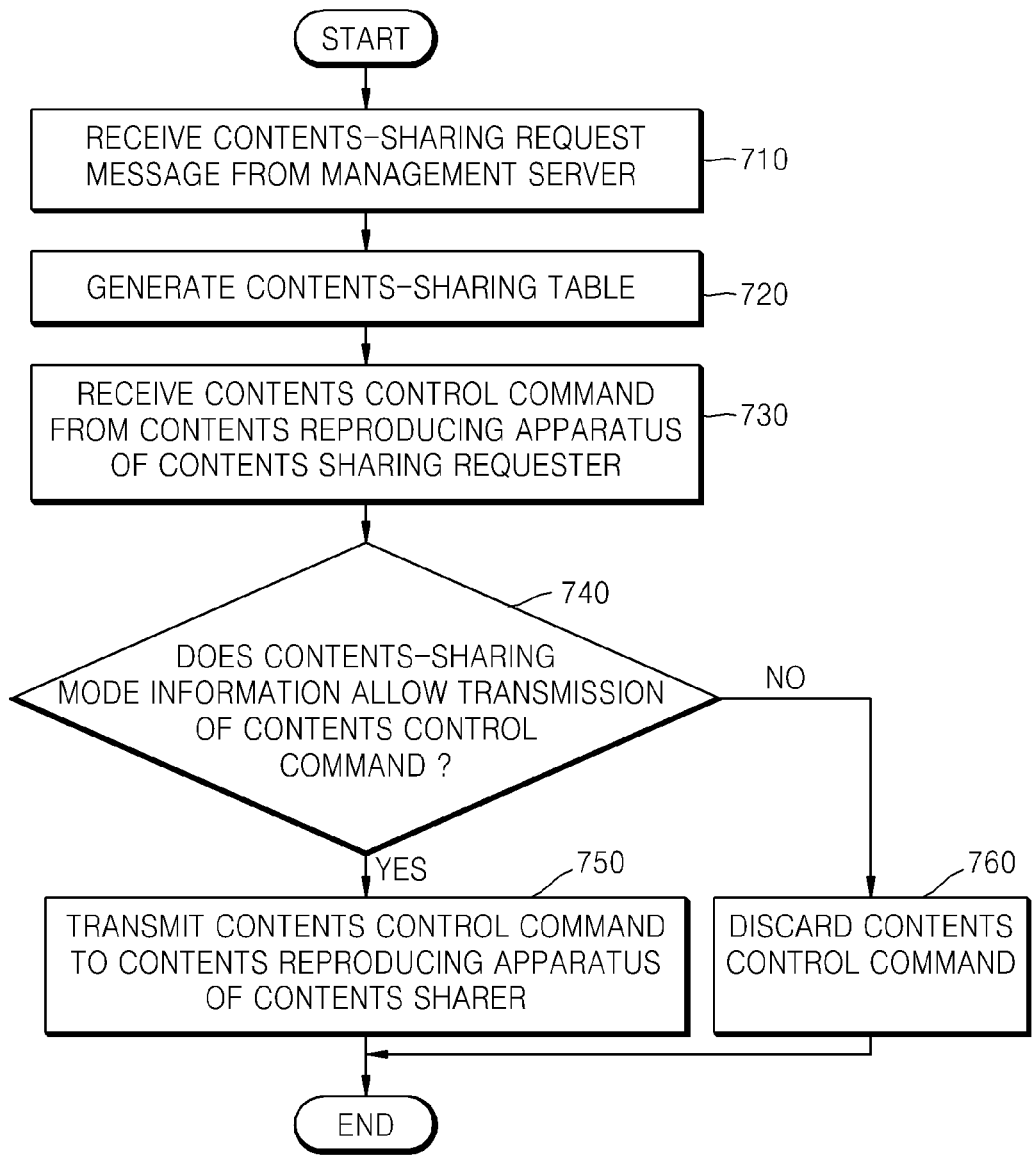
FIG. 7 is a flowchart of a contents-sharing control method performed by a streaming server, according to an exemplary embodiment.

FIG. 7 is a flowchart of a contents-sharing control method performed by a streaming server 140, according to an exemplary embodiment. Referring to FIG. 7, in operation 710, the streaming server 140 receives a contents-sharing request message from a management server 130. The streaming server 140 also receives contents authority information from a contents authority acquiring server.

In operation 720, the streaming server 140 generates a contents-sharing table by using information included in the contents-sharing request message. The contents-sharing table includes information about an IP and an ID of a sharing requester 110 and/or 120, information about an IP and an ID of a sharer 150 and/or 160, contents-sharing mode information, and reproduction start time information. The contents-sharing mode information describes contents-control commands which are to be shared, in units of control commands or overall control commands.

In operation 730, the streaming server 140 receives a contents control command from a contents reproducing apparatus 120 of the contents sharing requester 110.

In operation 740, the streaming server 140 determines whether the contents-sharing mode information allows transmission of the contents control command. If the contents-sharing mode information allows transmission of the contents control command, the method proceeds to operation 750. Otherwise, the method proceeds to operation 760.

In operation 750, the streaming server 140 transmits the contents control command to a contents reproducing apparatus 160 of the contents sharer 150.

In operation 760, the streaming server 140 discards the contents control command.

Figure 8:
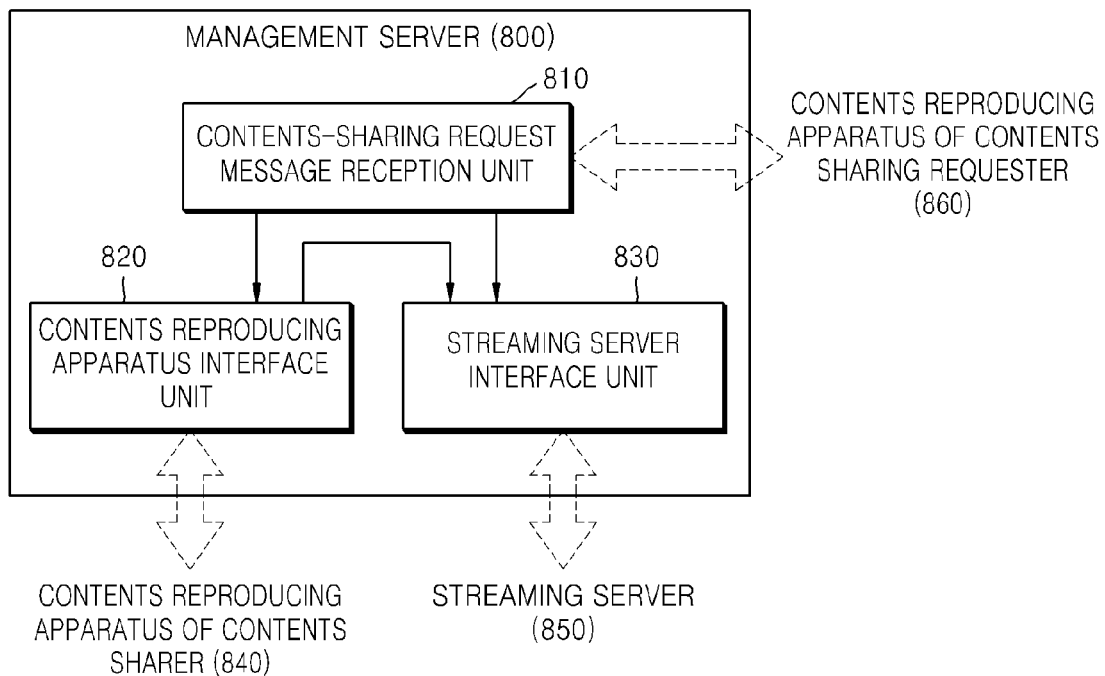
FIG. 8 is a block diagram of a structure of a management server for providing contents-sharing services, according to an exemplary embodiment.

FIG. 8 is a block diagram of a structure of a management server 130 for providing contents-sharing services, according to an exemplary embodiment. Referring to FIG. 8, the management server 130 includes a contents-sharing request message reception unit 810, a contents reproducing apparatus interface unit 820, and a streaming server interface unit 830.

The contents-sharing request message reception unit 810 receives a contents-sharing request message for a contents sharer 150 from a contents reproducing apparatus 120 of a sharing requester 110.

The contents reproducing apparatus interface unit 820 transmits a contents-sharing notify message to a contents reproducing apparatus 160 of the contents sharer 150.

If a management server and a contents authority acquiring server are the same, the contents reproducing apparatus interface unit 820 may transmit contents authority information for the contents sharer 150 to the contents reproducing apparatus 160.

The streaming server interface unit 830 transmits the contents-sharing request message to a streaming server 140. If the management server and the contents authority acquiring server are the same, the streaming server interface unit 830 may transmit the contents authority information for the contents sharer 150 to the streaming server 140.

It is understood that the contents authority acquiring server may be the same as or different from the management server 130 in various exemplary embodiments.

Figure 9:
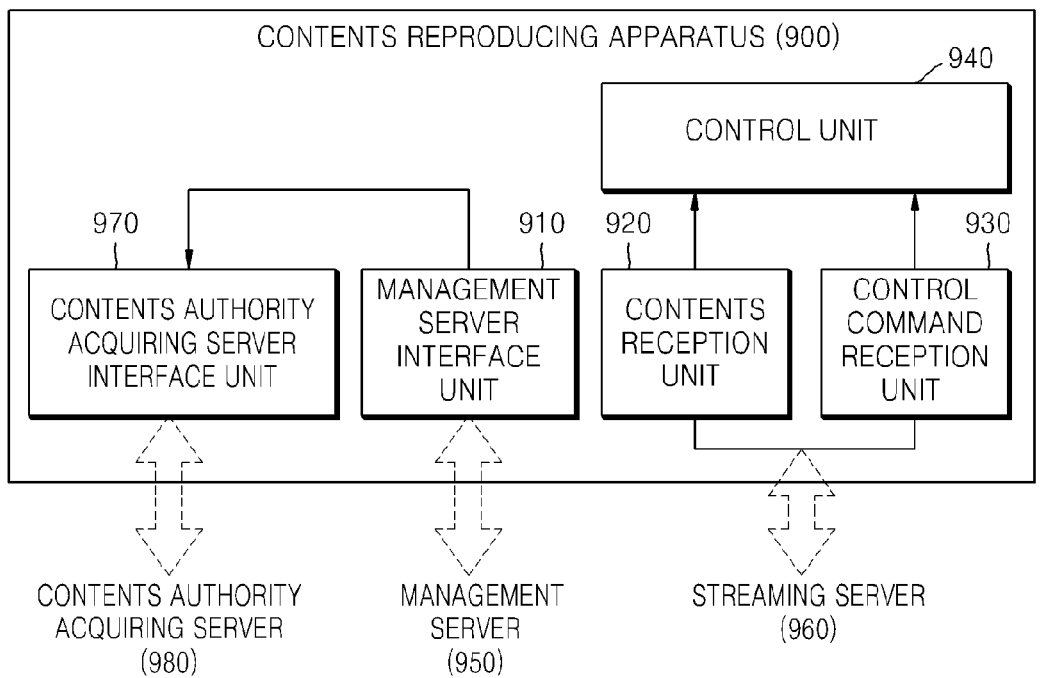
FIG. 9 is a block diagram of a structure of a contents reproducing apparatus that shares contents, according to an exemplary embodiment.

FIG. 9 is a block diagram of a structure of a contents reproducing apparatus 900 that shares contents, according to an exemplary embodiment. Referring to FIG. 9, the contents reproducing apparatus 900 includes a management server interface unit 910, a contents reception unit 920, a control command reception unit 930, and a control unit 940.

The management server interface unit 910 receives a contents-sharing notify message from a management server 130.

A contents authority acquiring server interface unit 970 receives contents authority information of a contents sharer 150 from a contents authority acquiring server by using contents authority acquiring server URL information included in the contents-sharing notify message received by the management server interface unit 910.

The contents reception unit 920 transmits a contents-sharing request message to a streaming server 140 by using information included in the contents-sharing notify message and the contents authority information. The contents-sharing notify message includes at least one of contents information, reproducing duration information, contents-sharing requester information, the contents authority acquiring server URL information, etc. The contents reception unit 920 receives contents from the streaming server 140 from a point in time when a contents sharing requester 110 performs reproduction, by using reproduction start time information included in the reproducing duration information.

The control command reception unit 930 receives a contents control command from the streaming server 140.

The control unit 940 controls contents reproduction by using the received contents control command.

Figure 10:
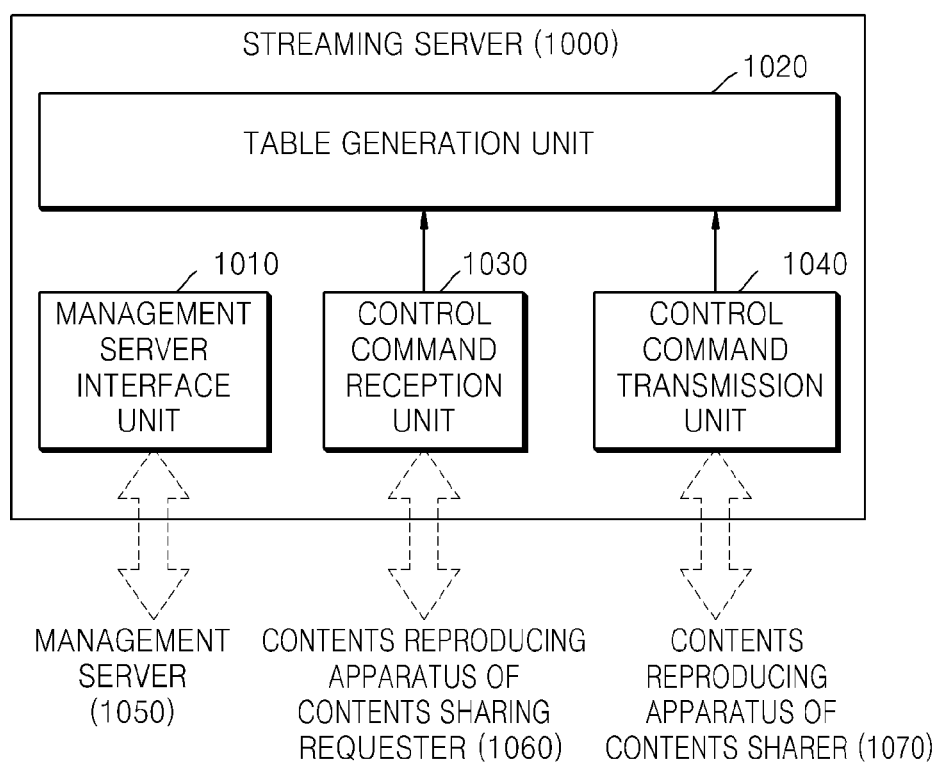
FIG. 10 is a block diagram of a structure of a streaming server that controls contents-sharing, according to an exemplary embodiment.

FIG. 10 is a block diagram of a structure of a streaming server 140 that controls contents-sharing, according to an exemplary embodiment. Referring to FIG. 10, the streaming server 140 includes a management server interface unit 1010, a table generation unit 1020, a control command reception unit 1030, and a control command transmission unit 1040.

The management server interface unit 1010 receives a contents-sharing request message from a management server 130. If the management server 130 is the same as a contents authority acquiring server, the management server interface unit 1010 may receive contents authority information of a contents sharer 150 from the management server 130. It is understood that the contents authority acquiring server may be the same as or different from the management server 130 in various exemplary embodiments.

The table generation unit 1020 generates a contents-sharing table by using information included in the contents-sharing request message.

The control command reception unit 1030 receives a contents control command from a contents reproducing apparatus 120 of a contents sharing requester 110. The control command transmission unit 1040 determines whether transmission of the contents control command is allowed, by referring to contents-sharing mode information. When the contents-sharing mode information allows transmission of the contents control command, the control command transmission unit 1040 transmits the contents control command to the contents reproducing apparatus 160 of the contents sharer 150. On the other hand, when the contents-sharing mode information does not allow transmission of the contents control command, the control command transmission unit 1040 discards the received contents control command.

While not restricted thereto, exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc. Also, exemplary embodiments may be written as computer programs transmitted over a computer-readable transmission medium, such as a carrier wave, and received and implemented in general-use or special-purpose digital computers that execute the programs.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method for providing a contents-sharing service performed in a server, the method comprising:
   receiving a first request message from a first reproducing apparatus, the request message indicating that the first reproducing apparatus offers to share a content with a second reproducing apparatus;
   transmitting the content both to the first reproducing apparatus and the second reproducing apparatus so that the content be shared and reproduced by the first and second reproducing apparatus;
   receiving a first control message from the first reproducing apparatus for controlling the reproducing of the content; and
   selectively transmitting a second control message based on the first request message and the first control message to the second reproducing apparatus, wherein the second control message is used by the second reproducing apparatus for controlling reproducing of the content.

2. The method of claim 1, wherein the transmitting the content comprises:
   transmitting a notify message generated using the received first request message to the second reproducing apparatus;
   receiving a second request message generated based on the notify message from the second reproducing apparatus requesting for the content; and
   transmitting the content both to the first reproducing apparatus and the second reproducing apparatus in response to receiving the second request message.

3. The method of claim 1, wherein the notify message comprises at least one from among information about content to be shared, reproducing duration information of the content, and information about the first reproducing apparatus.

4. The method of claim 3, wherein the notify message further comprises at least one from among information to provide personalized services for the second reproducing apparatus and information to provide advertisement services.

5. The method of claim 1, wherein the first request message comprises at least one from among information about the content to be shared, reproducing duration information of the content, information about the first reproducing apparatus, information about the second reproducing apparatus, and content-sharing mode information.

6. The method of claim 5, wherein the content-sharing mode information comprises at least one from among information on control commands allowed to be shared between the first and second reproducing apparatuses or information on control commands not allowed to be shared between the first and second reproducing apparatuses, and
   wherein the method further comprises determining whether the first control message is allowed control command to be shared based on the content-sharing mode information.

7. The method of claim 6, wherein the second control message is transmitted to the second reproducing apparatus when the first control message is determined to be allowed control command to be shared.

8. A method for content sharing performed in a first reproducing apparatus, the method comprising:
- transmitting a first request message to a server, indicating that the first reproducing apparatus offers to share a content with a second reproducing apparatus;
- receiving the content, wherein the content being transmitting both to the first and the second reproducing apparatuses so that the content be shared and reproduced by the first and second reproducing apparatus;
- transmitting a first control message to the server for controlling the reproducing of the content,
- wherein a second control message is generated at the server based on the first control message and transmitted to the second reproducing apparatus for controlling the reproducing of the content at the second producing apparatus.

9. The method of claim 8, wherein the first request message comprises at least one from among information about the content to be shared, reproducing duration information of the content, information about the first reproducing apparatus, information about the second reproducing apparatus, and content-sharing mode information.

10. The method of claim 9, wherein the reproducing duration information includes reproduction start time information, and
- wherein the content is reproduced by the first and second reproducing apparatus at substantially the same time based on the reproduction start time.

11. The method of claim 9, wherein the content-sharing mode information comprises at least one from among information on control commands allowed to be shared between the first and second reproducing apparatuses or information on control commands not allowed to be shared between the first and second reproducing apparatuses.

12. The method of claim 9, wherein the controlling of the reproducing of the content by the second reproducing apparatus based on the second control message is performed substantially the same time when the controlling of the reproducing of the content by the first reproducing apparatus is performed based on the first control message.

13. A method for content sharing performed in a second reproducing apparatus, the method comprising:
- receiving a notify message from a server, notifying that a first reproducing apparatus offers to share a content with the second reproducing apparatus;
- receiving, subsequent to the receiving a notify message, the content, wherein the content being transmitted both to the first and second reproducing apparatuses so that the content be shared and reproduced by the first and second reproducing apparatus;
- receiving, from the server, second control information for controlling the reproducing of the content, wherein the second control information is based on first control information generated by the first reproducing apparatus.

14. The method of claim 13, further comprising:
- transmitting, to the server, a request generated based on the notify message indicating accepting the offer and requesting for the content, and
- wherein the content is received in response to transmitting the request.

15. The method of claim 13, wherein the notify message including at least one from among information about content to be shared, reproducing duration information of the content, information about the first reproducing apparatus.

16. The method of claim 15, further comprising: reproducing the content from a point in time by using reproduction start time information included in the reproducing duration information of the content,
- wherein the content is reproduced by the first and second reproducing apparatus at substantially the same time based on the reproduction start time.

17. The method of claim 13, further comprising controlling the reproducing of the content based on the received second control information.

18. The method of claim 17, wherein the controlling of the reproducing of the content by the second reproducing apparatus based on the second control message is performed substantially the same time when the controlling of the reproducing of the content by the first reproducing apparatus is performed based on the first control message.

19. A server providing contents-sharing service, the server comprising:
- at least one processor operable to read and operate according to instructions within a computer program; and
- at least one memory operable to store at least portions of the computer program for access by the processor;
- wherein the computer program includes algorithms to cause the processor to implement:
  - a reproducing apparatus interface configured to
    - receive a first request message from a first reproducing apparatus, the request message indicating that the first reproducing apparatus offers to share a content with a second reproducing apparatus,
    - receive a first control message from the first reproducing apparatus for controlling the reproducing of the content, and
    - selectively transmit a second control message based on the first request message and the first control message to the second reproducing apparatus, wherein the second control message is used by the second reproducing apparatus for controlling reproducing of the content; and
  - a service interface configured to transmit the content both to the first reproducing apparatus and the second reproducing apparatus so that the content be shared and reproduced by the first and second reproducing apparatus.

20. The server of claim 19, wherein the reproducing apparatus interface is further configured to
- transmit a notify message generated using the received first request message to the second reproducing apparatus, and
- receive a second request message generated based on the notify message from the second reproducing apparatus requesting for the content, and
- wherein the service interface is further configured to transmit the content both to the first reproducing apparatus and the second reproducing apparatus in response to the reproducing apparatus interface's receiving the second request message.

21. The server of claim 19, wherein the notify message comprises at least one from among information about content to be shared, reproducing duration information of the content, and information about the first reproducing apparatus.

22. The server of claim 21, wherein the notify message further comprises at least one from among information to provide personalized services for the second reproducing apparatus and information to provide advertisement services.

23. The server of claim 19, wherein the first request message comprises at least one from among information about the content to be shared, reproducing duration information of the content, information about the first reproducing apparatus, information about the second reproducing apparatus, and content-sharing mode information.

24. The server of claim 23, wherein the content-sharing mode information comprises at least one from among information on control commands allowed to be shared between the first and second reproducing apparatuses or information on control commands not allowed to be shared between the first and second reproducing apparatuses, and
wherein the reproducing apparatus interface is further configured to determine whether the first control message is allowed control command to be shared based on the content-sharing mode information.

25. The server of claim 24, wherein the second control message is transmitted to the second reproducing apparatus when the first control message is determined to be allowed control command to be shared.

26. A first reproducing apparatus for content sharing, the first reproducing apparatus comprising:
at least one processor operable to read and operate according to instructions within a computer program; and
at least one memory operable to store at least portions of the computer program for access by the processor;
wherein the computer program includes algorithms to cause the processor to implement:
a message interface configured to
transmit a first request message to a server, indicating that the first reproducing apparatus offers to share a content with a second reproducing apparatus, and
transmit a first control message to the server for controlling the reproducing of the content; and
a service interface configured to receive the content, wherein the content being transmitting both to the first and the second reproducing apparatuses so that the content be shared and reproduced by the first and second reproducing apparatuses,
wherein a second control message is generated at the server based on the first control message and transmitted to the second reproducing apparatus for controlling the reproducing of the content at the second producing apparatus.

27. The first reproducing apparatus of claim 26, wherein the first request message comprises at least one from among information about the content to be shared, reproducing duration information of the content, information about the first reproducing apparatus, information about the second reproducing apparatus, and content-sharing mode information.

28. The first reproducing apparatus of claim 27, wherein the reproducing duration information includes reproduction start time information, and
wherein the content is reproduced by the first and second reproducing apparatuses at substantially the same time based on the reproduction start time.

29. The first reproducing apparatus of claim 27, wherein the content-sharing mode information comprises at least one from among information on control commands allowed to be shared between the first and second reproducing apparatuses or information on control commands not allowed to be shared between the first and second reproducing apparatuses.

30. The first reproducing apparatus of claim 27, wherein the controlling of the reproducing of the content by the second reproducing apparatus based on the second control message is performed substantially the same time when the controlling of the reproducing of the content by the first reproducing apparatus is performed based on the first control message.

31. A second reproducing apparatus for contents sharing, the second reproducing apparatus comprising:
at least one processor operable to read and operate according to instructions within a computer program; and
at least one memory operable to store at least portions of the computer program for access by the processor;
wherein the computer program includes algorithms to cause the processor to implement:
a message interface configured to
receive a notify message from a server, notifying that a first reproducing apparatus offers to share a content with the second reproducing apparatus, and
receive, from the server, second control information for controlling the reproducing of the content, wherein the second control information is based on first control information generated by the first reproducing apparatus; and
a service interface configured to receive, subsequent to the message interface's receiving a notify message, the content, wherein the content being transmitted both to the first and second reproducing apparatuses so that the content be shared and reproduced by the first and second reproducing apparatuses.

32. The second reproducing apparatus of claim 31, wherein the message interface is further configured to transmit, to the server, a request generated based on the notify message indicating accepting the offer and requesting for the content, and
wherein the content is received in response to the transmitting request from the message interface.

33. The second reproducing apparatus of claim 31, wherein the notify message including at least one from among information about content to be shared, reproducing duration information of the content, information about the first reproducing apparatus.

34. The second reproducing apparatus of claim 33, further comprising:
a controller configured to reproduce the content from a point in time by using reproduction start time information included in the reproducing duration information of the content, and
wherein the content is reproduced by the first and second reproducing apparatus at substantially the same time based on the reproduction start time.

35. The second reproducing apparatus of claim 31, further comprising a controller configured to control the reproducing of the content based on the received second control information.

36. The second reproducing apparatus of claim 35, wherein the controlling of the reproducing of the content by the second reproducing apparatus based on the second control message is performed substantially the same time when the controlling of the reproducing of the content by the first reproducing apparatus is performed based on the first control message.

* * * * *